(12) United States Patent
Luce

(10) Patent No.: US 10,384,769 B2
(45) Date of Patent: Aug. 20, 2019

(54) TWO STAGE STRUT ALLOWING LOW INITIAL COMPRESSION LOAD

(71) Applicant: Goodrich Corporation, Charlotte, NC (US)

(72) Inventor: William E Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 383 days.

(21) Appl. No.: 15/451,098

(22) Filed: Mar. 6, 2017

(65) Prior Publication Data

US 2018/0194460 A1 Jul. 12, 2018

Related U.S. Application Data

(60) Provisional application No. 62/443,208, filed on Jan. 6, 2017.

(51) Int. Cl.

| *G01P 5/00* | (2006.01) |
| *B64C 25/60* | (2006.01) |
| *B64D 45/00* | (2006.01) |
| *F16F 9/32* | (2006.01) |
| *F16F 15/023* | (2006.01) |

(Continued)

(52) U.S. Cl.
CPC .............. *B64C 25/60* (2013.01); *B64C 25/22* (2013.01); *B64D 45/0005* (2013.01); *F16F 9/18* (2013.01); *F16F 9/3214* (2013.01); *F16F 9/3235* (2013.01); *F16F 9/3292* (2013.01); *F16F 15/023* (2013.01); *G01P 5/00* (2013.01); *B64D 2045/008* (2013.01)

(58) Field of Classification Search
CPC .......... G01P 13/025; G01P 5/165; G01P 5/14; G01P 5/16; G01P 13/02; G01P 5/00; G01P 5/02; G01P 21/025; G01P 5/12; G01P 5/26; G01P 5/005; G01P 5/175; G01P 5/18; G01P 5/24; G01P 13/045; G01P 15/036; G01P 1/02; G01P 21/00; G01P 3/62; G01P 5/07; G01P 5/08; G01P 5/245; B64D 43/02; B64D 15/20; B64D 43/00; B64D 15/12; B64D 1/18; B64D 2033/0286; B64D 33/02; B64D 33/08; B64D 45/00
USPC ....................................................... 73/170.02
See application file for complete search history.

(56) References Cited

U.S. PATENT DOCUMENTS

| 4,552,324 A | 11/1985 | Hrusch |
| 4,729,529 A | 3/1988 | Hrusch |

(Continued)

FOREIGN PATENT DOCUMENTS

| EP | 2921404 | 9/2015 |
| GB | 2453554 | 4/2009 |

OTHER PUBLICATIONS

European Patent Office, European Search Report dated Feb. 12, 2018 in Application No. 18150196.6-1010.

*Primary Examiner* — Andre J Allen
(74) *Attorney, Agent, or Firm* — Snell & Wilmer, L.L.P.

(57) ABSTRACT

A landing detection system for a landing gear assembly of an aircraft may comprise a moveable member mechanically coupled between an aircraft wheel and a strut piston, wherein the moveable member is in communication with a strut chamber pressure of the landing gear assembly, wherein the moveable member moves relative to the strut piston in response to a first force applied to the aircraft wheel and the strut piston strokes in response to a second force applied to the aircraft wheel.

20 Claims, 10 Drawing Sheets

(51) Int. Cl.
*F16F 9/18* (2006.01)
*B64C 25/22* (2006.01)

(56) References Cited

U.S. PATENT DOCUMENTS

| | | |
|---|---|---|
| 6,120,009 A | 9/2000 | Gatehouse et al. |
| 6,676,076 B1 | 1/2004 | Davies |
| 8,382,032 B2 | 2/2013 | Bennett et al. |
| 8,886,402 B1 | 11/2014 | Lou |
| 8,973,725 B2 * | 3/2015 | Lavigne ................ B64C 25/60 188/269 |
| 9,403,592 B2 | 8/2016 | Kallio |
| 9,541,151 B2 * | 1/2017 | Martin ................ F16F 9/3271 |
| 2006/0284008 A1 | 12/2006 | Nance |
| 2009/0210105 A1 | 8/2009 | Lusby |
| 2010/0096499 A1 * | 4/2010 | Luce ................ B64C 25/14 244/102 SS |
| 2015/0266592 A1 | 9/2015 | Mellor |
| 2016/0230831 A1 | 8/2016 | Martin et al. |
| 2018/0079494 A1 * | 3/2018 | Cottet ................ B64C 25/22 |
| 2018/0290734 A1 * | 10/2018 | Mellor ................ B64C 25/20 |
| 2018/0305001 A1 * | 10/2018 | Urbinati ................ B64C 25/60 |

* cited by examiner

TWO STAGE STRUT ALLOWING LOW INITIAL COMPRESSION LOAD

CROSS REFERENCE TO RELATED APPLICATIONS

This application claims priority to, and the benefit of, U.S. Provisional Patent Application Ser. No. 62/443,208, entitled "NOVEL TWO STAGE STRUT ALLOWING LOW INITIAL COMPRESSION LOAD," filed on Jan. 6, 2017. The '208 Application is hereby incorporated by reference in its entirety for all purposes.

FIELD

The present disclosure relates to aircraft systems, and more specifically, to landing systems.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

The fully extended pressure exerted onto a strut piston of a shock absorber may be large for various reasons. For example, it may be desirable to maintain a larger pressure in order for strut seals to properly work. Furthermore, it may also be desirable for an aircraft to support large static loads of the aircraft and react to ground loads. However, it may also be desirable for the same aircraft to provide an indication that the aircraft has touched the ground when landing in response to a light load.

SUMMARY

A landing detection system of a landing gear assembly of an aircraft is disclosed herein, in accordance with various embodiments. The landing detection system may comprise a moveable member mechanically coupled between an aircraft wheel and a strut piston, wherein the moveable member is in communication with a strut chamber pressure of the landing gear assembly, wherein the moveable member moves relative to the strut piston in response to a first force applied to the aircraft wheel and the strut piston strokes in response to a second force applied to the aircraft wheel.

In various embodiments, the second force may be greater than the first force. The moveable member may comprise a secondary piston. The secondary piston may be disposed at least partially within an open end of the strut piston. The secondary piston may translate within the strut piston and at least partially defines a secondary chamber. The moveable member may be coupled to the strut piston via a first link pivotally coupled to the moveable member and a second link pivotally coupled to the strut piston. The moveable member may be pivotally coupled to the strut piston. The moveable member may be pivotally coupled to a secondary piston via a connecting link, the connecting link pivotally coupled to the secondary piston and pivotally coupled to the moveable member, wherein the secondary piston translates relative to the strut piston in response to the moveable member pivoting.

A landing gear assembly for an aircraft is disclosed herein, in accordance with various embodiments, A landing gear assembly may comprise a strut cylinder, a strut piston operatively coupled to the strut cylinder, and a landing detection system. The landing detection system may comprise a moveable member mechanically coupled between an aircraft wheel and the strut piston, wherein the moveable member is in communication with a strut chamber pressure of the landing gear assembly, wherein the moveable member moves relative to the strut piston in response to a first force applied to the aircraft wheel and the strut piston strokes in response to a second force applied to the aircraft wheel.

In various embodiments, the second force may be greater than the first force. The moveable member may comprise a secondary piston. The secondary piston may be disposed at least partially within an open end of the strut piston. The secondary piston may translate within the strut piston and at least partially define a secondary chamber. The landing gear assembly may further comprise a metering pin coupled to the strut piston, and a metering pin orifice extending through the metering pin, whereby the secondary chamber is in fluid communication with a strut chamber disposed within the strut cylinder via the metering pin orifice. The strut chamber pressure may act on the secondary piston. The landing detection system may further comprise a secondary metering pin for compression damping of the secondary piston. The moveable member may be pivotally coupled to the strut piston. The landing detection system may further comprise a piston head disposed within the secondary chamber and at least partially defining a recoil chamber, a first piston orifice disposed in the piston head whereby a fluid travels from the secondary chamber to the recoil chamber in response to the secondary piston moving to a compressed position, and a second piston orifice disposed in the piston head whereby the fluid travels from the recoil chamber to the secondary chamber in response to the secondary piston moving to an extended position. The landing detection system may further comprise a retaining member configured to seal the first piston orifice to prevent the fluid from flowing from the recoil chamber to the secondary chamber in response to the secondary piston moving to the extended position, wherein a first cross-section area of the first piston orifice is greater than a second cross section area of the second piston orifice.

A method for detecting touchdown of an aircraft is disclosed herein, in accordance with various embodiments. A method for detecting touchdown of an aircraft may comprise receiving, by a landing detection system, a first force, translating, by a moveable member, relative to a strut piston, wherein the moveable member is mechanically coupled between an aircraft wheel and the strut piston, wherein the moveable member is in communication with a strut chamber pressure of a landing gear assembly, wherein the first force is less than a second force required to overcome the strut chamber pressure to stroke the strut piston relative to a strut cylinder, and detecting that the moveable member has moved relative to the strut piston to determine that the aircraft wheel has touched down.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
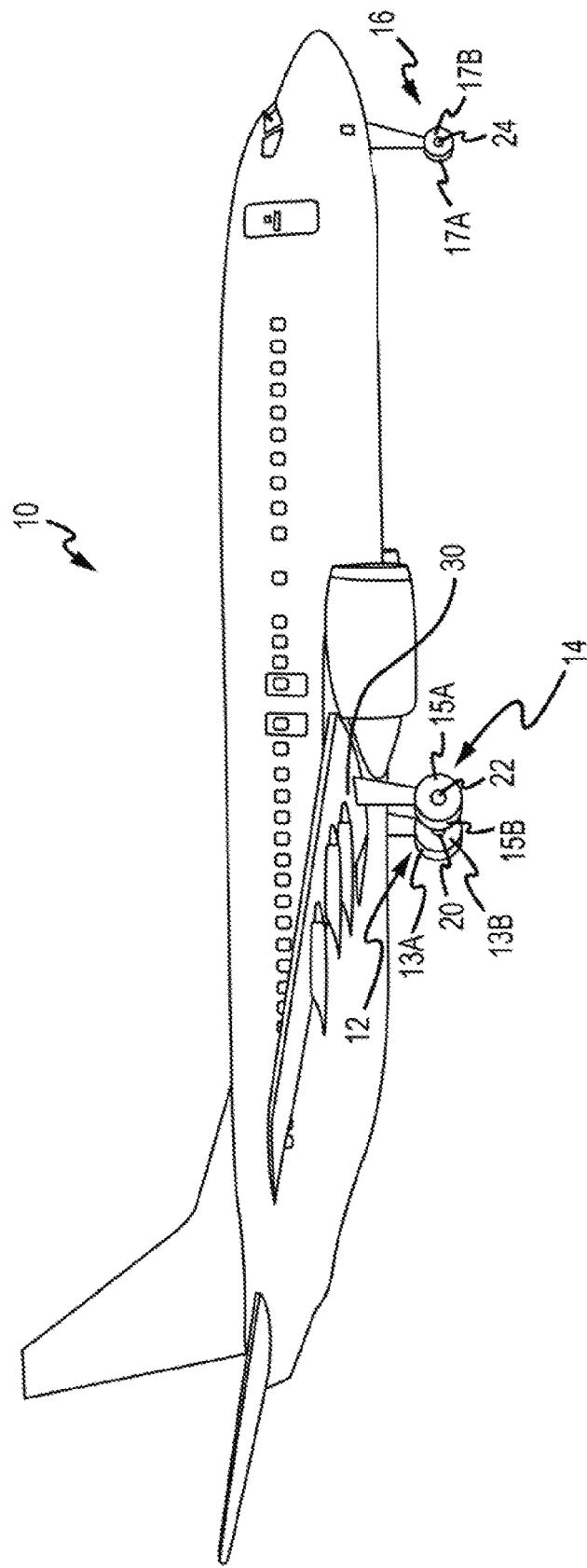
FIG. 1 illustrates an exemplary aircraft having landing gear, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

As disclosed herein, a landing detection system may add a second stroking area to a shock strut that strokes an initial distance in response to a lower load to allow an indication of touchdown at a significantly lower load. This may be accomplished by adding a secondary chamber below the metering pin diaphragm in a single stage strut. A passage may be added down the center of the metering pin to provide fluid (and pressure) communication to this secondary chamber. The passage can be added to allow some level of damping as oil is forced through this passage. This passage can be adjusted relative to stroke of the secondary chamber by addition of a metering pin. In this manner, an aircraft axle may be detached from a main strut piston and arranged to stroke a short distance independent of the main strut piston against this pressure, using a smaller piston area. This can be accomplished using either a sliding moveable member or a pivoting moveable member. The strut may have a single gas charge and oil volume. In either case, the fully extended pressure is initially compressed using the smaller piston as the axle strokes this first distance. Once it reaches its fully compressed position, further stroking of the axle strokes the primary piston and the gas volume is compressed using that piston area for the remainder of the stroke.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off and land without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight and/or may be coupled to the wings 30 and/or fuselage of the aircraft 10.

Aircraft landing gears 12, 14, 16, in accordance with the present disclosure, may include a shock strut. In various embodiments, and with reference to FIG. 2, a landing gear assembly 100 is illustrated. The landing gear assembly 100 may be implemented as one of the landing gears 12, 14, 16 described above with reference to FIG. 1. The landing gear assembly 100 includes a shock strut 200. In various embodiments, shock strut 200 may be configured to absorb and dampen forces transmitted by landing gear assembly 100 to aircraft 10.

Shock strut 200 may comprise, for example, a strut piston 212 and a strut cylinder 213. Strut cylinder 213 may be configured to receive strut piston 212 in a manner that allows the two components to telescope together and absorb and dampen forces transmitted by landing gear assembly 100. In various embodiments, a fluid, such as a hydraulic fluid, and oil, and/or a gas is located within strut cylinder 213. Strut cylinder 213 and strut piston 212 may, for example, be configured to seal such that liquid contained within strut cylinder 213 is prevented from leaking as strut piston 212 translates relative to strut cylinder 213. Further, strut cylinder 213 may be configured to contain a gas such as nitrogen gas or air. Shock strut 200 may comprise a proximal end and a distal end, wherein the distal end is opposite the proximal end, the distal end being the end of the shock strut closest to a wheel or wheel assembly of a vehicle, such as landing gear assembly 100, for example. A gas chamber may be positioned above an oil chamber (referred to as an "air-over-oil" arrangement) or vice versa, where the term "above" in this context means in the direction of the proximal end of the shock strut. The shock strut 200 may further include a recoil chamber (see recoil chamber 572 of FIG. 5A and FIG. 5B) having an orifice support (see piston head 560 of FIG. 5A and FIG. 5B) via which the recoil chamber is fluidly connected to the oil chamber. Similarly, strut cylinder 213 and strut piston 212 may be sealed such that gas is prevented from leaking as strut piston 212 moves relative to strut cylinder 213. As such, shock strut 200 may comprise a pressurized environment within strut cylinder 213.

Figure 2:
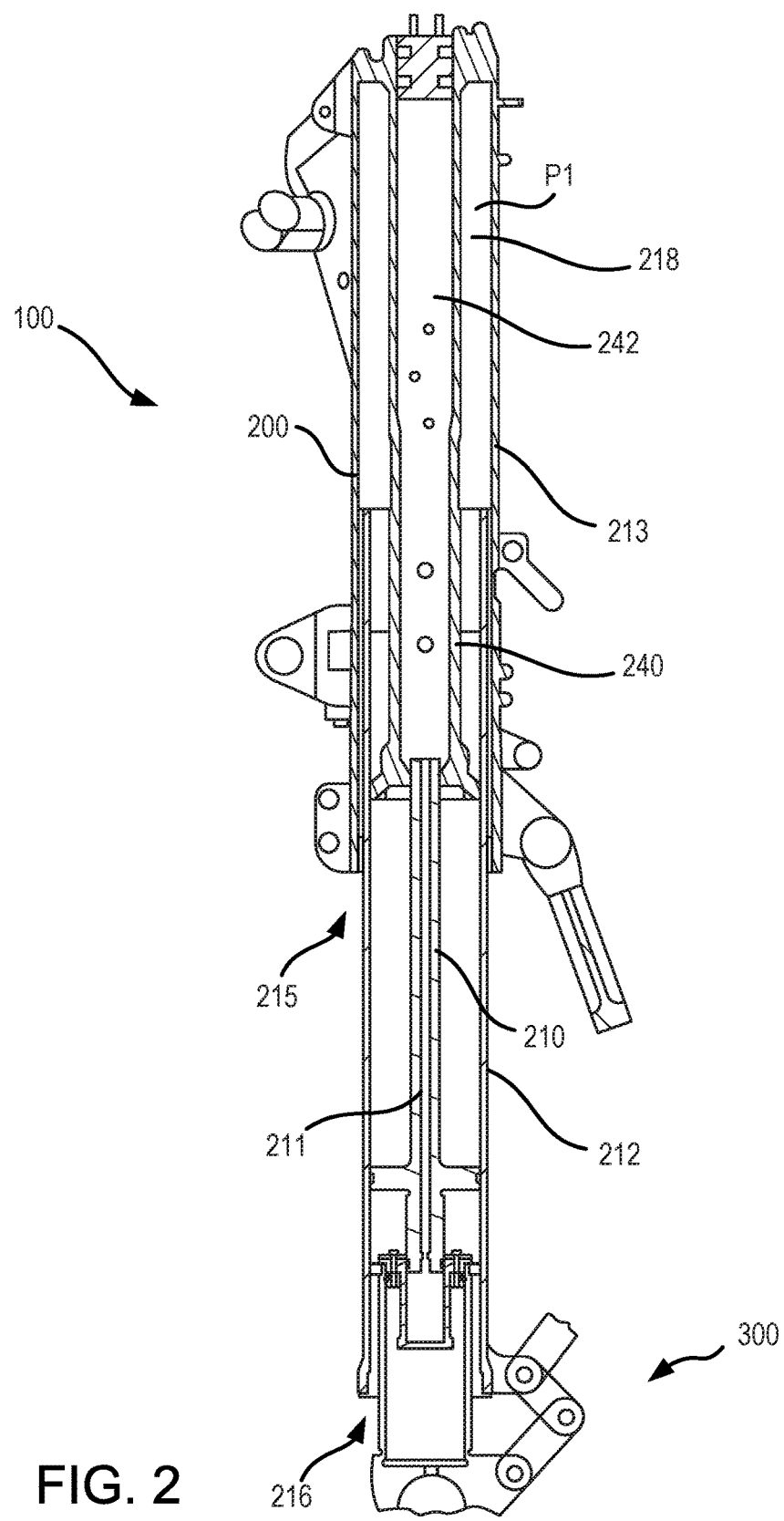
FIG. 2 illustrates a schematic of a shock strut for use in landing gear assemblies of an aircraft, the shock strut comprising a landing detection system, in accordance with various embodiments.

With reference to FIG. 2, a cross-section of a shock strut 200 is shown in a fully extended position. The strut cylinder 213 may comprise various components. For example, the strut cylinder 213 may comprise a hollow circular tube having various components disposed within. Strut cylinder 213 may comprise a strut chamber 218. Strut cylinder 213 may comprise an orifice support tube 240. Orifice support tube 240 may comprise a hollow tube having a plurality of orifices through which oil or gas may travel. In this regard, orifice support tube 240 may comprise a tube channel 242 in fluid communication with strut chamber 218. In this regard strut chamber 218 may comprise tube channel 242. Various fluids may be disposed in strut chamber 218. Air may be disposed within strut chamber 218. Oil may be disposed within strut chamber 218, whether alone or in combination with a gas such as air or nitrogen gas.

In various embodiments, strut piston 212 may comprise a hollow circular tube. At least a portion of strut piston 212 may be received by open end 215 of strut cylinder 213. Strut piston 212 may comprise a metering pin 210. Metering pin 210 may translate with strut piston 212. Metering pin 210 may be received in orifice support tube 240. A metering pin orifice 211 may extend axially through metering pin 210. Strut piston 212 may be reciprocally received within the strut cylinder 213. In various embodiments, strut piston 212 may be reciprocally received within strut cylinder 213 in a concentric relationship with and between the strut cylinder 213 and orifice support tube 240.

In various embodiments, one or more bearings may be disposed between strut cylinder 213 and strut piston 212 against which the strut piston 212 slides.

In various embodiments, landing gear assembly 100 may comprise a landing detection system 300. At least a portion of landing detection system 300 may be received by open end 216 of strut piston 212.

Figure 3A:
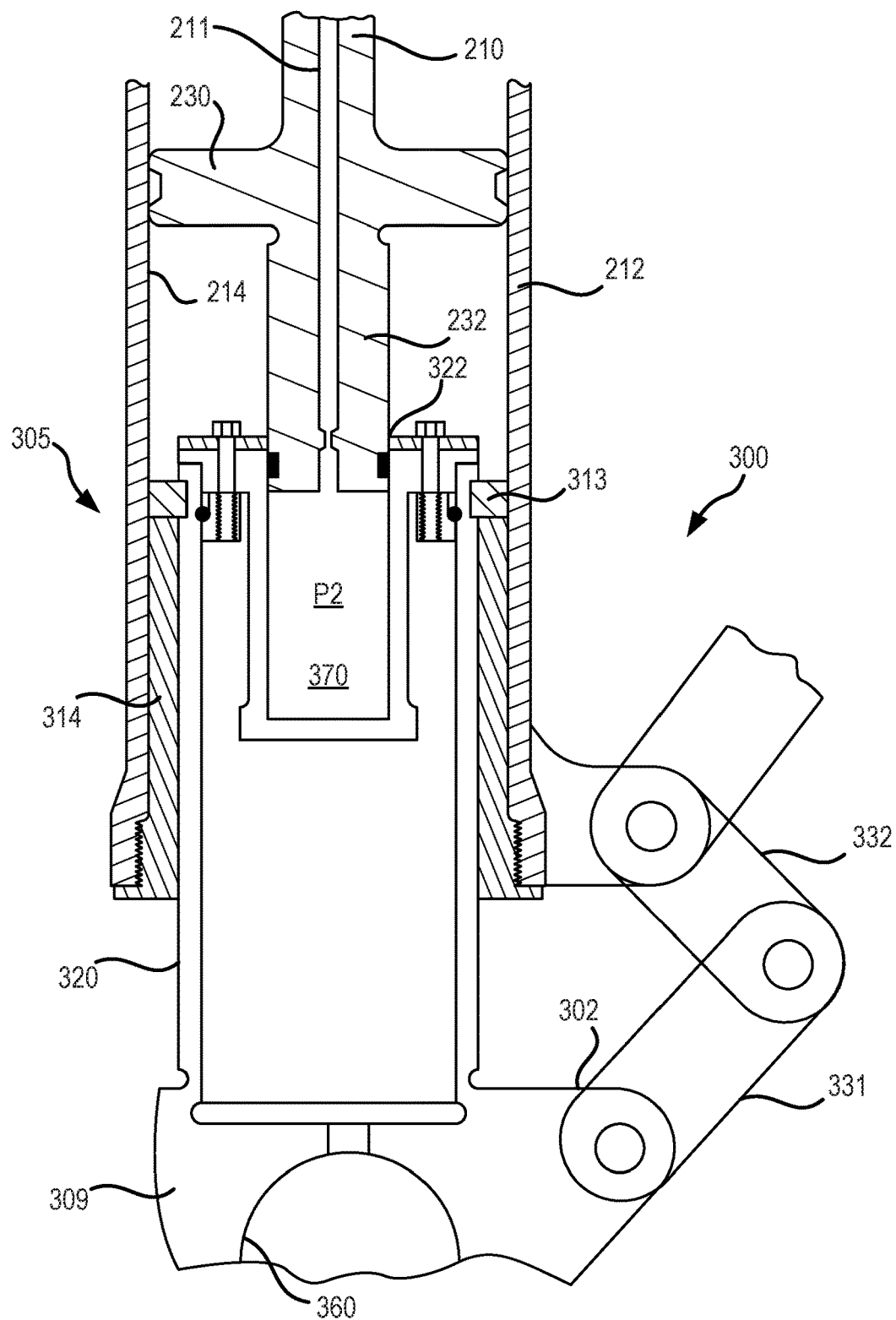
FIG. 3A illustrates a schematic of a landing detection system in a fully extended position with a translating moveable member, in accordance with various embodiments.

With reference to FIG. 3A, landing detection system 300 is illustrated in a fully extended position, in accordance with various embodiments. Landing detection system 300 may comprise a moveable member 309. A secondary piston 320 may extend from moveable member 309. Secondary piston 320 may translate within strut piston 212. In various embodiments, a guide system 305 may be coupled between moveable member 309 and strut piston 212. Guide system 305 may comprise a sleeve 314 coupled between moveable member 309 and strut piston 212 to aid in relative movement thereof. Guide system 305 may comprise an outstop ring 313 coupled between strut piston 212 and moveable member 309 to retain the secondary piston 320 within the sleeve 314. In various embodiments, sleeve 314 may be threadingly coupled to strut piston 212. Moveable member 309 may comprise an attachment point 360. Moveable member 309 may be coupled to a wheel via attachment point 360. For example, attachment point 360 may be coupled to an axle or a bogey beam. In this regard, in response to a wheel contacting the ground, a force may be transferred from the ground, through the wheel, to moveable member 309. Said force may cause moveable member to slide or translate towards strut piston 212 until moveable member 309 contacts strut piston 212. In this manner, it may be said that landing detection system 300 may stroke in response to a first force. As discussed with reference to FIG. 7, the force may increase until it overcomes the pressure within strut chamber 218, with momentary reference to FIG. 2, at which point strut piston 212 begins to stroke.

In various embodiments, a first torque link 331 may be pivotally coupled to moveable member 309. A second torque link 332 may be pivotally coupled to strut piston 212. First torque link 331 may be pivotally coupled to second torque link 332. In this regard, moveable member 309 may be coupled to strut piston 212 via first torque link 331 and second torque link 332.

In various embodiments, metering pin 210 may comprise a diaphragm 230 coupled to strut piston 212 and extending from metering pin 210. Diaphragm 230 may be coupled to a radially inward surface 214 of strut piston 212. Metering pin 210 may comprise an extension 232 extending from diaphragm 230 towards secondary piston 320. A secondary chamber 370 may be defined by secondary piston 320 and extension 232. In various embodiments, extension 232 of metering pin 210 may be received by an opening 322 of secondary piston 320. Secondary chamber 370 may be in fluid communication with strut chamber 218 via metering pin orifice 211, with momentary reference to FIG. 2. In this regard, the pressure P1 of strut chamber 218 may be equal to the pressure P2 of secondary chamber 370. The diameter of secondary piston 320 defining secondary chamber 370 is less than the diameter of strut piston 212. In this regard, although pressure P1 and pressure P2 may be equal, the force exerted on strut piston 212 via pressure P1 is greater than the force exerted on secondary piston 320 via pressure P2 due to the decrease area of secondary piston 320 containing secondary chamber 370 relative to the area of strut piston 212 containing strut chamber 218.

Figure 3B:
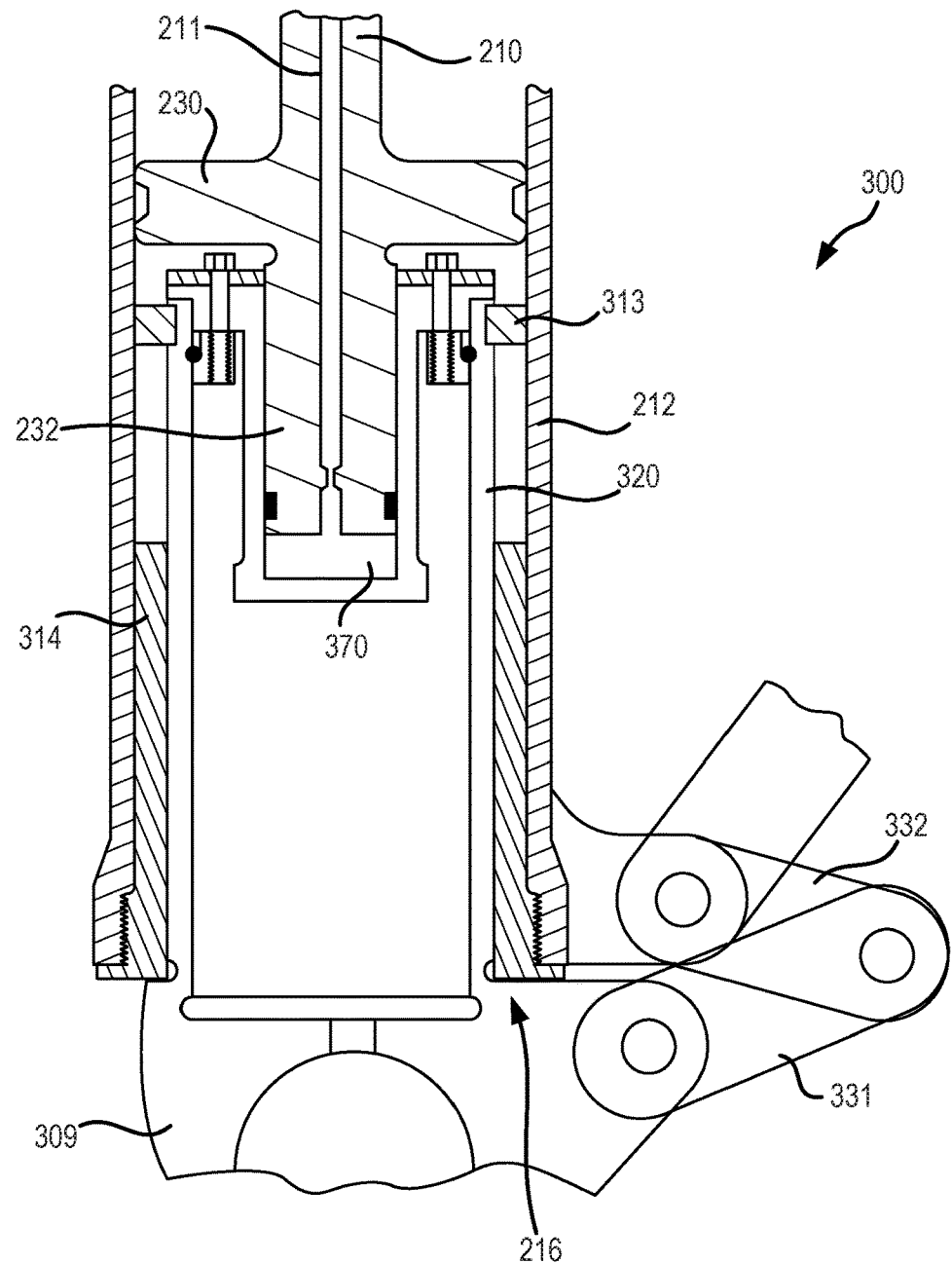
FIG. 3B illustrates a schematic of the landing detection system of FIG. 3A in a fully compressed position, in accordance with various embodiments.
Figure 7:
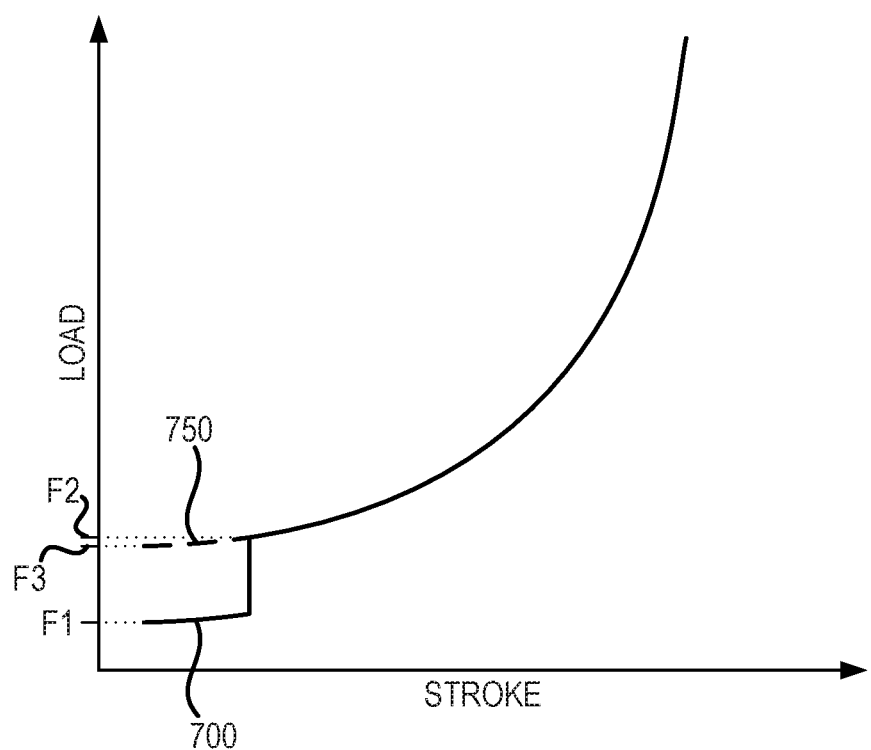
FIG. 7 illustrates a load curve of a shock strut having a landing detection system, in accordance with various embodiments.

In this regard, with additional reference to FIG. 7, a load curve 700 for shock strut 200 is illustrated, in accordance with various embodiments. Load curve 700 represents the load of shock strut 200 versus the stroke of shock strut 200. In this regard, secondary piston 320 may begin to stroke (i.e., translate relative to strut piston 212) in response to a force (also referred to herein as a first force) F1. With combined reference to FIG. 3B and FIG. 7, secondary piston 320 may stroke within strut piston 212 until secondary piston 320 engages strut piston 212, as illustrated in FIG. 3B. Stated differently, secondary piston 320 may stroke within strut piston 212 until secondary piston 320 is mechanically prevented from compressing into strut piston 212. For example, moveable member 309 may mechanically engage strut piston 212 at open end 216. A load may be transferred from moveable member 309 to strut piston 212. Moving from left to right along load curve 700, the force may increase until it reaches force (also referred to herein as a second force) F2 at which point strut piston 212 may begin to stroke. Stated differently, strut piston 212 may begin to compress into strut cylinder 213 in response to force F2 acting on shock strut 200. Force F1 and force F2 may be compressive forces. As previously discussed, force F2 is greater than force F1. In this regard, secondary piston 320 may begin to stroke at a force which is less than the force at which strut piston 212 begins to stroke. For example, a typical shock strut assembly may begin to stroke at force F3 as illustrated by load curve 750 of a typical shock strut assembly. In this manner, a touchdown event (i.e., when an aircraft's wheels touch the ground during landing) may be detected sooner with landing gear assembly 100 than with a typical landing gear assembly. For example, a sensor may detect movement of moveable member 309 to determine a touchdown event.

With reference to FIG. 3A, a stroke position sensor 302 may be coupled to landing gear assembly 100. Stroke position sensor 302 may be configured to measure the position of secondary piston 320 relative to strut piston 212, which is conventionally referred to as the stroke of landing detection system 300 at a desired time (referred to herein as a stroke profile). The stroke position sensor 302 may be configured to measure the position indirectly, for example, by measuring the orientation of one or more landing detection system links 331, 332 (or other components). For example, position sensor 302 may measure the stroke of secondary piston 320 at any point during the duty cycle of landing detection system 300.

Figure 4A:
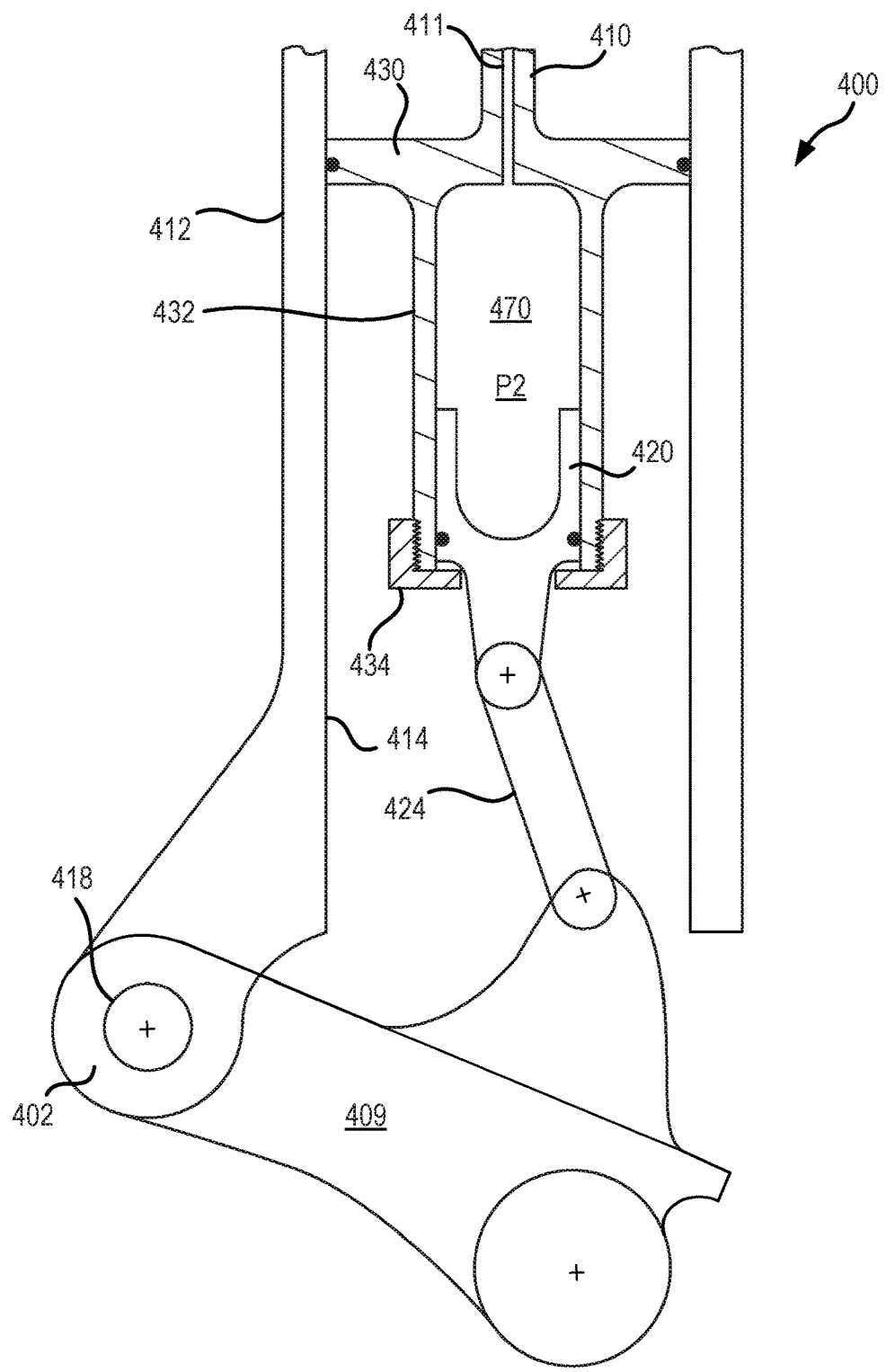
FIG. 4A illustrates a schematic of a landing detection system in a fully extended position with a pivoting moveable member, in accordance with various embodiments.

With reference to FIG. 4A, a landing detection system 400 is illustrated, in accordance with various embodiments. Landing detection system 400 may include moveable member 409 and secondary piston 420. Moveable member 409 may be coupled to secondary piston 420 via a connecting link 424. Connecting link 424 may be pivotally coupled to moveable member 409. Connecting link 424 may be pivotally coupled to secondary piston 420. Moveable member 409 may be pivotally coupled to a strut piston 412 via a pivot 418. Strut piston 412 may be similar to strut piston 212, with momentary reference to FIG. 3A. A metering pin 410 may be coupled to strut piston 412. Metering pin 410 may be similar to metering pin 210, with momentary reference to FIG. 3A. Metering pin 410 may comprise a diaphragm 430 and an extension 432. Metering pin 410 may be coupled to inner surface 414 of strut piston 412 via diaphragm 430. Extension 432 may extend from diaphragm 430. In various embodiments, extension 432 may comprise a hollow cylinder. In various embodiments, secondary piston 420 may be received into extension 432. A retaining member 434 may be coupled to extension 432 to retain secondary member within extension 432. A secondary chamber 470 may be defined by secondary piston 420 and extension 432. Secondary chamber 470 may be in fluid communication with strut chamber 218 via metering pin orifice 411, with momentary reference to FIG. 2. In this regard, the pressure P1 of strut chamber 218 may be equal to the pressure P2 of secondary chamber 470. The diameter of secondary piston 420 defining secondary chamber 470 is less than the diameter of strut piston 412. In this regard, although pressure P1 and pressure P2 may be equal, the force exerted on strut piston 412 via pressure P1 is greater than the force exerted on secondary piston 420 via pressure P2 due to the decreased area of secondary piston 420 containing secondary chamber 470 relative to the area of strut piston 412 containing strut chamber 218.

Figure 4B:
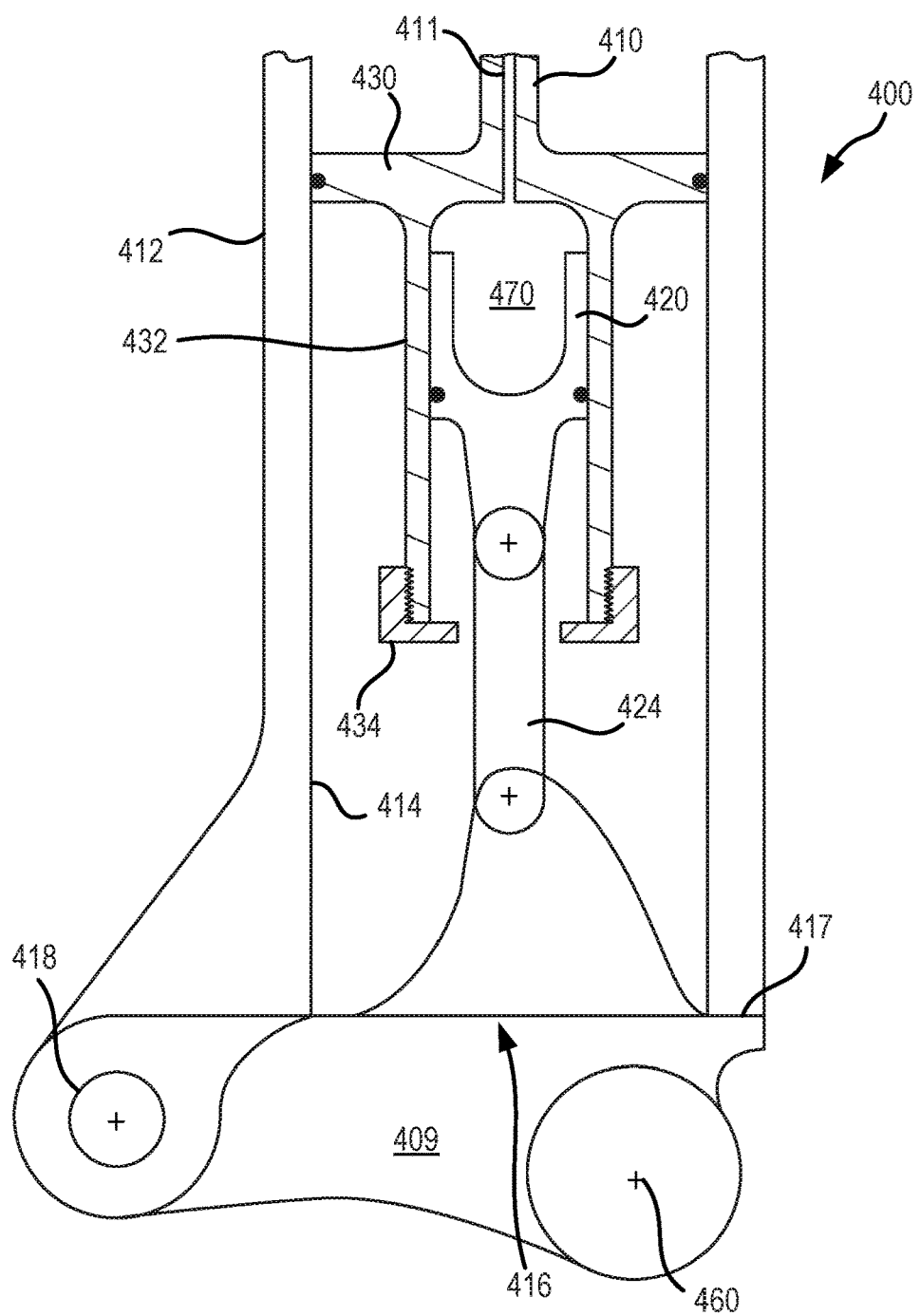
FIG. 4B illustrates a schematic of the landing detection system of FIG. 4A in a fully compressed position, in accordance with various embodiments.

With reference to FIG. 4B, secondary piston 420 is illustrated in a fully compressed position, in accordance with various embodiments. Secondary piston 420 may stroke in response to moveable member 409 pivoting about pivot 418. Moveable member 409 may pivot towards open end 416 of strut piston 412 and secondary piston 420 may translate within extension 432 of metering pin 410 in response to the pivoting. Moveable member 409 may engage strut piston 412 via surface 417 of moveable member 409. Moveable member 409 may comprise an attachment point 460. Moveable member 409 may be coupled to a wheel via attachment point 460. For example, attachment point 460 may be coupled to an axle or a bogey beam. In this regard, in response to a wheel contacting the ground, a force may be transferred from the ground, through the wheel, to moveable member 409. Said force may cause moveable member to pivot towards strut piston 412 until moveable member 409 contacts strut piston 412. In this manner, it may be said that landing detection system 400 may stroke in response to a first force. As discussed with reference to FIG. 7, the force may increase until it overcomes the pressure within strut chamber 218, with momentary reference to FIG. 2, at which point strut piston 412 begins to stroke.

With reference to FIG. 4A, a stroke position sensor 402 may be coupled to landing detection system 400. Stroke position sensor 402 may be configured to measure the position of moveable member 409 relative to strut piston 412, which is conventionally referred to as the stroke of landing detection system 400 at a desired time (referred to herein as a stroke profile). The stroke position sensor 402 may be configured to measure the position indirectly or directly. Position sensor 402 may measure the stroke of moveable member 409 at any point during the duty cycle of landing detection system 400.

Figure 5A:
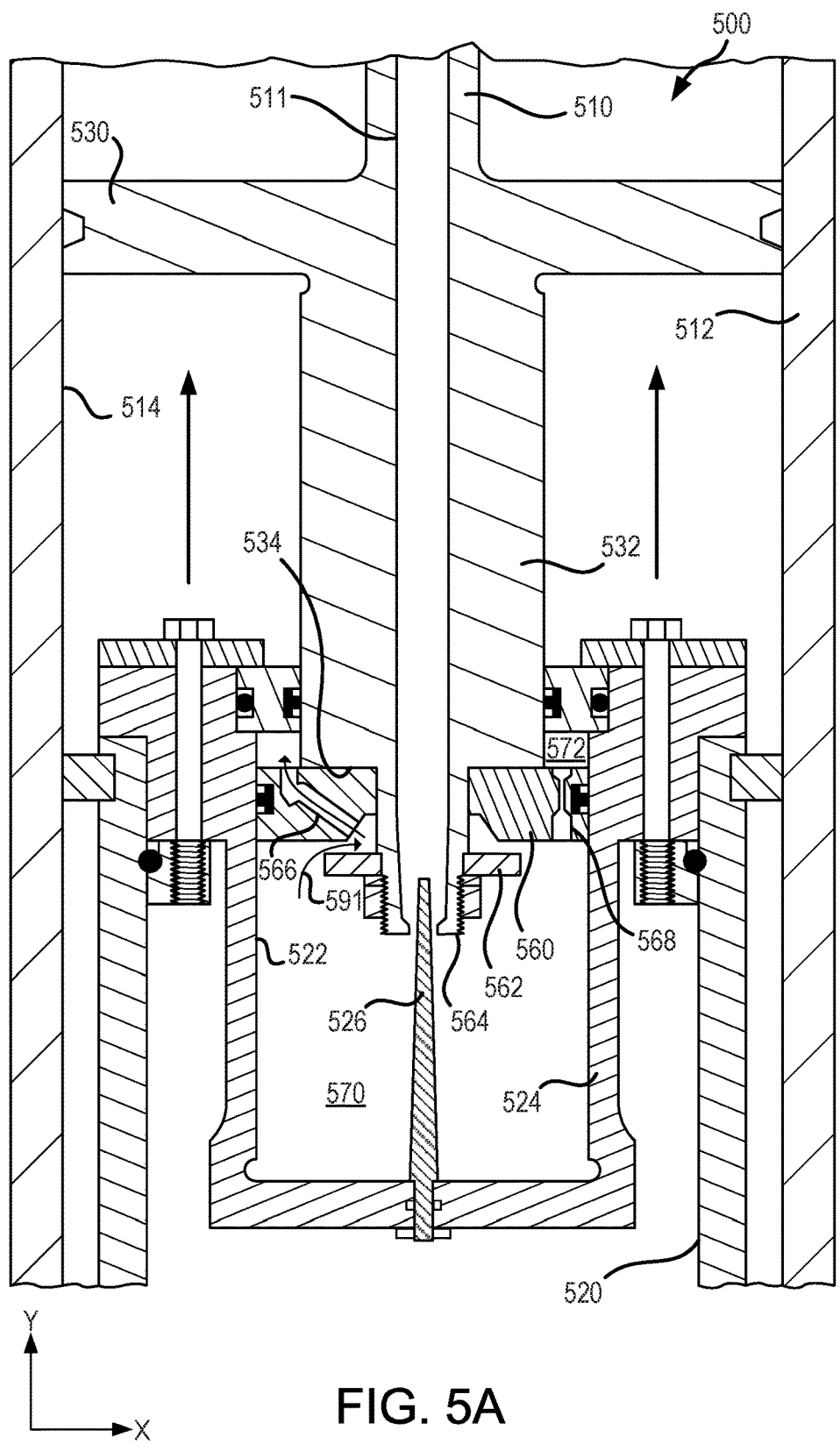
FIG. 5A illustrates a schematic of a landing detection system moving towards a compressed position and having a metering pin and recoil dampening arrangement, in accordance with various embodiments.

With reference to FIG. 5A, landing detection system 500 is illustrated with a secondary piston 520 moving towards a compressed position, in accordance with various embodiments. XY-axes are provided for ease of illustration. Landing detection system 500 may be similar to landing detection system 300 of FIG. 3A, except that landing detection system 500 further includes a secondary metering pin 526 and a recoil damping arrangement. Secondary piston 520 may translate within strut piston 512.

In various embodiments, a metering pin (also referred to herein as a primary metering pin) 510 may comprise a diaphragm 530 coupled to strut piston 512 and extending from metering pin 510. Diaphragm 530 may be coupled to a radially inward surface 514 of strut piston 512. Metering pin 510 may comprise an extension 532 extending from diaphragm 530 towards secondary piston 520. Extension 532 may be concentric with strut piston 512. Secondary piston 520 may be concentric with strut piston 512. A secondary chamber 570 may be defined by opening 522 (i.e., inner cylinder 524 of secondary piston 520) and extension 532. In various embodiments, extension 532 of metering pin 510 may be received by an opening 522 of secondary piston 520. Secondary chamber 570 may be in fluid communication with strut chamber 218 via metering pin orifice 511, with momentary reference to FIG. 2.

In various embodiments, a piston head (also referred to herein as a flapper valve piston head) 560 may be coupled to extension 532 of metering pin 510. Piston head 560 may be configured to slide or translate along extension 532. A retaining member 562 may be coupled to a terminus 564 of extension 532. Retaining member 562 may retain piston head 560 to metering pin 510. Piston head 560 may comprise a first piston orifice 566 disposed in piston head 560. Secondary chamber 570 may be in fluid communication with recoil chamber 572 via first piston orifice 566. Piston head 560 may comprise a second piston orifice 568 disposed in piston head 560. Secondary chamber 570 may be in fluid communication with recoil chamber 572 via second piston orifice 568. In response to secondary piston 520 moving towards a compressed position, as illustrated in FIG. 5A, piston head 560 may translate along metering pin 510 with secondary piston 520 (in the positive Y-direction) until piston head 560 is mechanically prevented from translating with secondary piston 520 via stopping surface 534 of metering pin 510 opening a flow path 591 for fluid to travel from secondary chamber 570 to recoil chamber 572.

In various embodiments, an inner cylinder 524 may be coupled to secondary piston 520. Inner cylinder 524 may define opening 522. A secondary metering pin 526 may be coupled to inner cylinder 524. Secondary metering pin 526 may be concentric with metering pin 510. Secondary metering pin 526 may be received into metering pin orifice 511 of metering pin 510. Secondary metering pin 526 may provide compression dampening of secondary piston 520. Metering pin 510 may meter the flow of fluid within metering pin orifice 511. As secondary piston 520 compresses secondary metering pin 526 may gradually choke flow through metering pin orifice 511, thus minimizing impact load from secondary piston 520 to strut piston 512. For example, with momentary reference to FIG. 3B, the impact of moveable member 309 on open end 216 may be minimized. Further, with momentary reference to FIG. 4B, the impact of moveable member 409 on strut piston 412 via surface 417 may be minimized. The geometry of secondary metering pin 526 may be tuned for compression damping. For example, secondary metering pin 526 may be tapered.

Figure 5B:
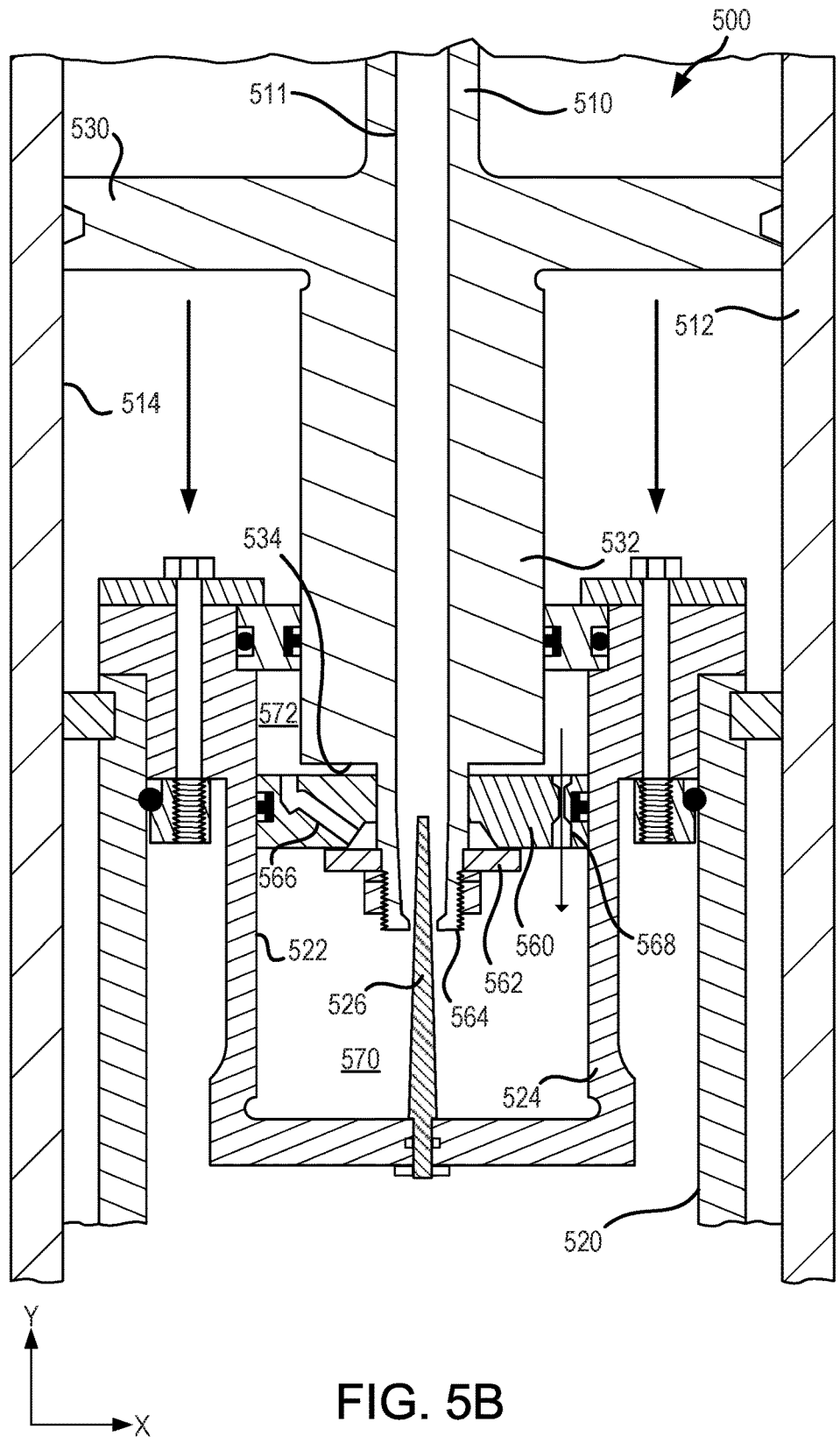
FIG. 5B illustrates a schematic of the landing detection system of FIG. 5A moving towards an extended position, in accordance with various embodiments.

With reference to FIG. 5B, landing detection system 500 is illustrated moving towards an extended position, in accordance with various embodiments. XY-axes are provided for ease of illustration. In response to secondary piston 520 moving towards an extended position, as illustrated in FIG. 5B, piston head 560 may translate along metering pin 510 with secondary piston 520 (in the negative Y-direction) until piston head 560 is mechanically prevented from translating with secondary piston 520 via retaining member 562, closing flow path 591 and preventing fluid from traveling from recoil chamber 572 to secondary chamber 570 via first piston orifice 566. In this regard, fluid may travel from recoil chamber 572 to secondary chamber 570 via second piston orifice 568. In various embodiments, the smallest cross-section area of second piston orifice 568 may be smaller than the smallest cross-section area of first piston orifice 566. In this manner, the recoil or extension of secondary piston 520 may be dampened.

Figure 6:
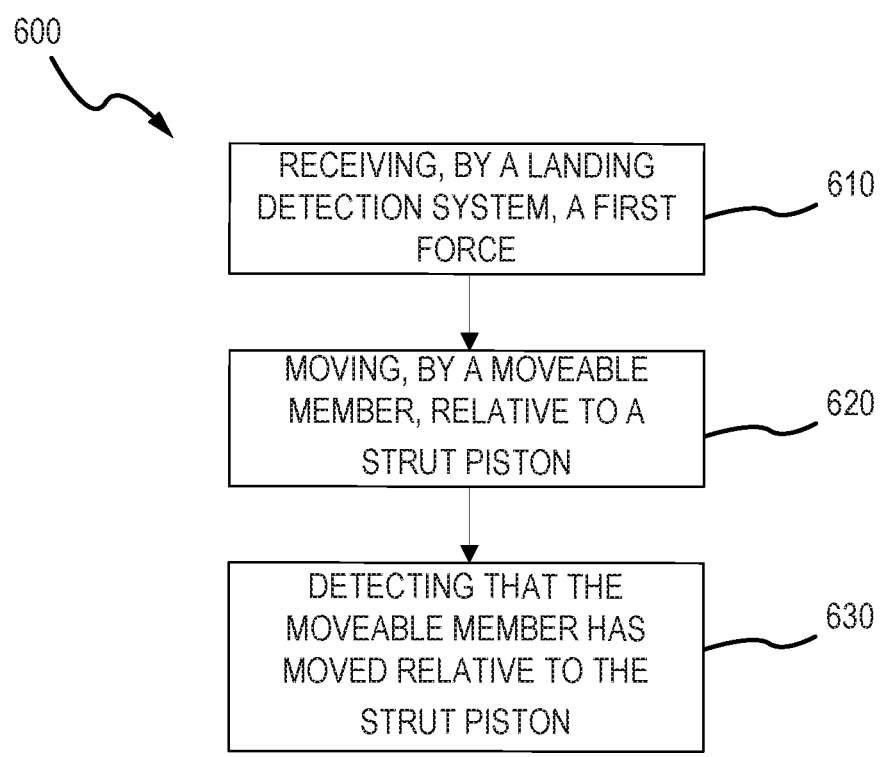
FIG. 6 illustrates a method for detecting touchdown of an aircraft, in accordance with various embodiments.

Also disclosed herein, according to various embodiments and with reference to FIG. 6, is a method 600 for detecting touchdown of an aircraft. The method 600 includes, according to various embodiments, receiving, by a landing detection system, a first force at step 610, moving, by a moveable member, relative to a strut piston at step 620, and detecting that the moveable member has moved relative to the strut piston to determine that the aircraft wheel has touched down at step 630.

With combined reference to FIG. 3A and FIG. 6, step 610 may include receiving, by landing detection system 300, a first force. The first force may be received via a tire coupled to moveable member 309 in response to said tire touching the ground during a landing maneuver. Step 620 may include moving, by moveable member 309, relative to a strut piston 212. Step 630 may include detecting that moveable member 309 has moved relative to strut piston 212 to determine that the aircraft wheel (e.g., wheel 15A of FIG. 1) has touched down. For example, stroke position sensor 302 may detect said movement.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing detection system of a landing gear assembly of an aircraft, the landing detection system comprising:
   a moveable member mechanically coupled between an aircraft wheel and a strut piston,
   wherein the moveable member is in communication with a strut chamber pressure of the landing gear assembly;
   wherein the moveable member moves relative to the strut piston in response to a first force applied to the aircraft wheel and the strut piston strokes in response to a second force applied to the aircraft wheel.

2. The landing detection system of claim 1, wherein the second force is greater than the first force.

3. The landing detection system of claim 2, wherein the moveable member comprises a secondary piston.

4. The landing detection system of claim 3, wherein the secondary piston is disposed at least partially within an open end of the strut piston.

5. The landing detection system of claim 4, wherein the secondary piston translates within the strut piston and at least partially defines a secondary chamber.

6. The landing detection system of claim 3, wherein the moveable member is coupled to the strut piston via a first link pivotally coupled to the moveable member and a second link pivotally coupled to the strut piston.

7. The landing detection system of claim 1, wherein the moveable member is pivotally coupled to the strut piston.

8. The landing detection system of claim 7, wherein the moveable member is pivotally coupled to a secondary piston via a connecting link, the connecting link pivotally coupled to the secondary piston and pivotally coupled to the moveable member,
   wherein the secondary piston translates relative to the strut piston in response to the moveable member pivoting.

9. A landing gear assembly for an aircraft, comprising:
   a strut cylinder;
   a strut piston operatively coupled to the strut cylinder;
   a landing detection system comprising:
      a moveable member mechanically coupled between an aircraft wheel and the strut piston,
      wherein the moveable member is in communication with a strut chamber pressure of the landing gear assembly;
      wherein the moveable member moves relative to the strut piston in response to a first force applied to the aircraft wheel and the strut piston strokes in response to a second force applied to the aircraft wheel.

10. The landing gear assembly of claim 9, wherein the second force is greater than the first force.

11. The landing gear assembly of claim 10, wherein the moveable member comprises a secondary piston.

12. The landing gear assembly of claim 11, wherein the secondary piston is disposed at least partially within an open end of the strut piston.

13. The landing gear assembly of claim 12, wherein the secondary piston translates within the strut piston and at least partially defines a secondary chamber.

14. The landing gear assembly of claim 13, wherein the landing gear assembly further comprises:
   a metering pin coupled to the strut piston; and
   a metering pin orifice extending through the metering pin, whereby the secondary chamber is in fluid communication with a strut chamber disposed within the strut cylinder via the metering pin orifice.

15. The landing gear assembly of claim 14, wherein the strut chamber pressure acts on the secondary piston.

16. The landing gear assembly of claim 14, further comprising a secondary metering pin for compression damping of the secondary piston.

17. The landing gear assembly of claim 9, wherein the moveable member is pivotally coupled to the strut piston.

18. The landing gear assembly of claim 14, wherein the landing detection system further comprises:
   a piston head disposed within the secondary chamber and at least partially defining a recoil chamber;
   a first piston orifice disposed in the piston head whereby a fluid travels from the secondary chamber to the recoil chamber in response to the secondary piston moving to a compressed position; and
   a second piston orifice disposed in the piston head whereby the fluid travels from the recoil chamber to the secondary chamber in response to the secondary piston moving to an extended position.

19. The landing gear assembly of claim 18, wherein the landing detection system further comprises:
   a retaining member configured to seal the first piston orifice to prevent the fluid from flowing from the recoil chamber to the secondary chamber in response to the secondary piston moving to the extended position,
   wherein a first cross-section area of the first piston orifice is greater than a second cross section area of the second piston orifice.

20. A method for detecting touchdown of an aircraft, comprising:
   receiving, by a landing detection system, a first force;
   translating, by a moveable member, relative to a strut piston, wherein the moveable member is mechanically coupled between an aircraft wheel and the strut piston;
   wherein the moveable member is in communication with a strut chamber pressure of a landing gear assembly;
   wherein the first force is less than a second force required to overcome the strut chamber pressure to stroke the strut piston relative to a strut cylinder; and
   detecting that the moveable member has moved relative to the strut piston to determine that the aircraft wheel has touched down.

* * * * *